United States Patent [19]

Stocker

[11] Patent Number: 4,715,738
[45] Date of Patent: Dec. 29, 1987

[54] CARBURETOR THROTTLE LEVER/SPEED CONTROL CONNECTOR

[75] Inventor: Raymond Stocker, West Bloomfield, Mich.

[73] Assignee: Ford Motor Company, Dearborn, Mich.

[21] Appl. No.: 945,147

[22] Filed: Dec. 22, 1986

[51] Int. Cl.⁴ .............................................. F16B 21/18
[52] U.S. Cl. ....................................... 403/24; 403/155
[58] Field of Search ......................... 403/24, 155, 324; 123/400, 401, 403

[56] References Cited

U.S. PATENT DOCUMENTS

| | | | |
|---|---|---|---|
| 1,350,314 | 8/1920 | Katzmarek | 24/665 |
| 2,358,597 | 9/1944 | Russell | 74/513 |
| 2,364,266 | 12/1944 | Bryce | 24/665 |
| 2,865,662 | 12/1958 | Nurmse | 403/378 |
| 3,417,186 | 10/1969 | Luebbert et al. | 403/320 |
| 3,604,404 | 9/1971 | Pitchford | 74/470 |
| 3,863,519 | 2/1975 | Natori | 74/474 |
| 4,443,144 | 4/1984 | Defrancq | 403/155 |
| 4,447,032 | 5/1984 | Olsen | 248/558 |
| 4,505,058 | 3/1985 | Peterson | 403/324 |
| 4,637,741 | 1/1987 | Gillert | 403/155 |

*Primary Examiner*—William A. Cuchlinski, Jr.
*Attorney, Agent, or Firm*—Robert E. McCollum; Clifford L. Sadler

[57] ABSTRACT

A universal connector for interconnecting a linearly movable engine speed control mechanism to a linearly and arcuately movable carburetor throttle valve control lever, including an elongated plastic body having a bore at one end, the body receiving in the bore a pin type shaft that projects from the throttle valve lever, the body at the other end capturing the chain-like end of the speed control cable, the shaft having a rounded end with an annular groove just behind the end that cooperates with one leg of a hairpin like spring clip that locks or unlocks the plastic body from the shaft upon inward or outward movement/deflection of the leg, the body thus being able to swivel on the shaft without relative lateral movement to accurately translate a linear movement of the speed control cable to an arcuate and linear movement of the throttle control lever.

4 Claims, 8 Drawing Figures

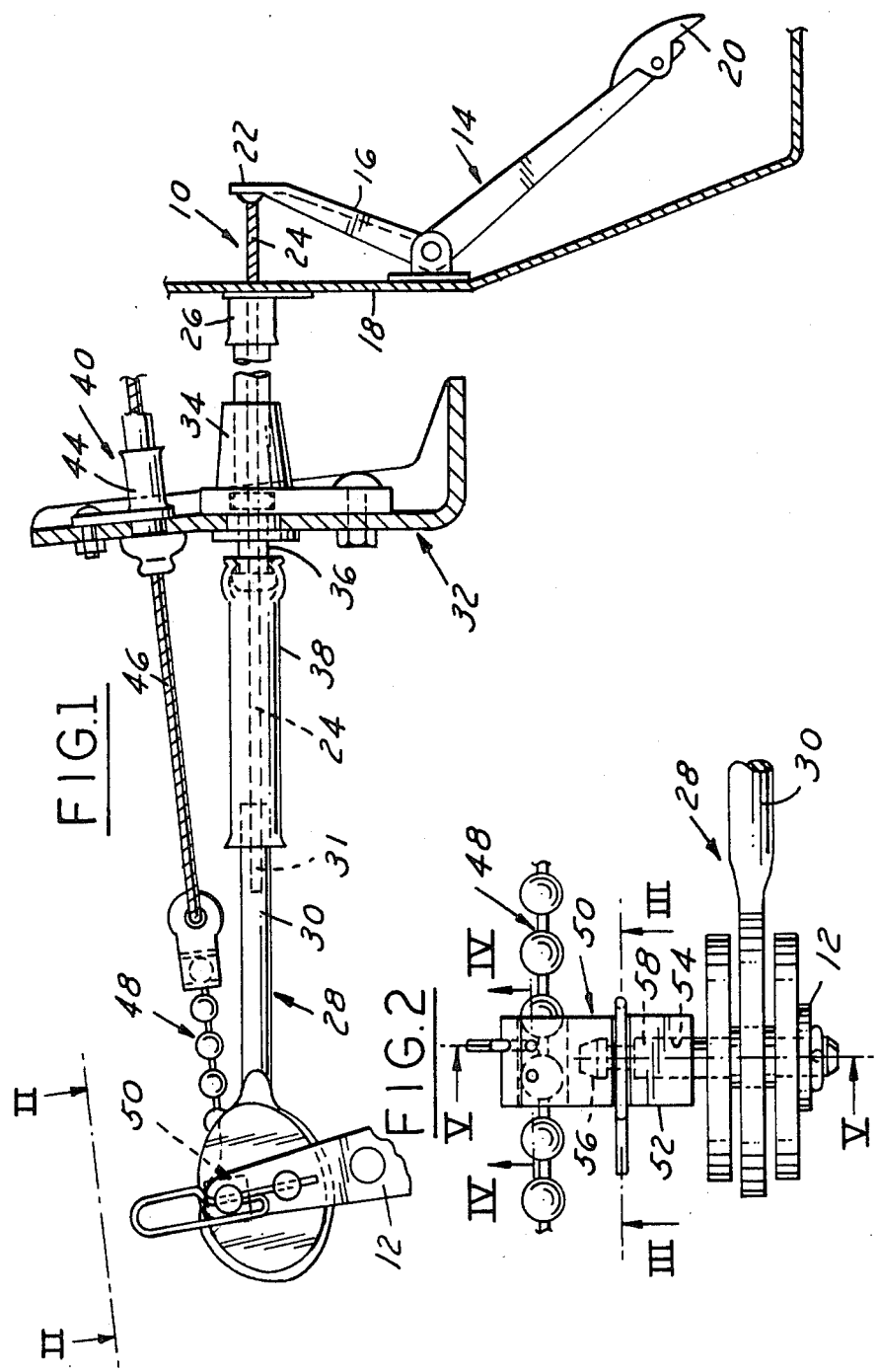

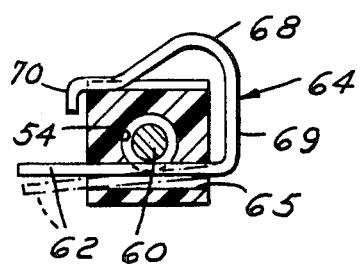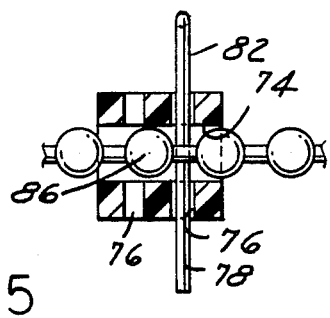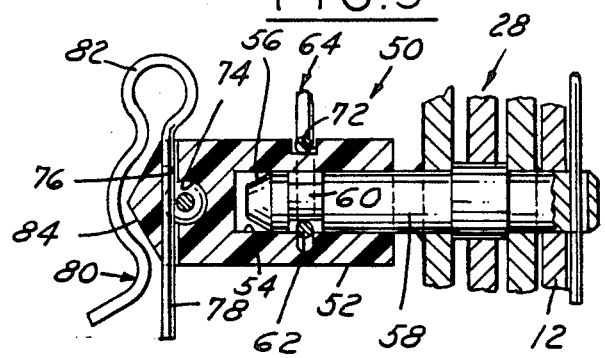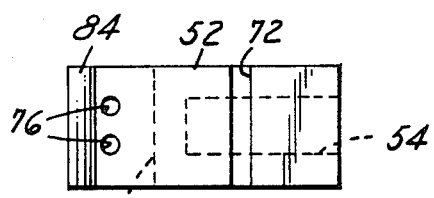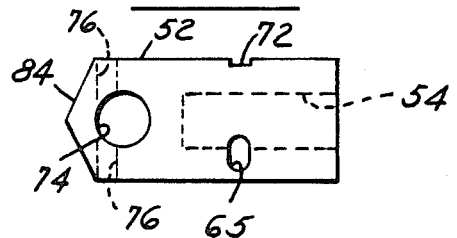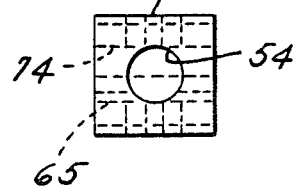

CARBURETOR THROTTLE LEVER/SPEED CONTROL CONNECTOR

This invention relates in general to a carburetor, and more particularly to a universal connector for interconnecting a carburetor throttle control lever to an engine speed control member.

An object of the invention is to connect an arcuately and linearly movable accelerator pedal cable connected throttle lever to an essentially linearly movable speed control member in a manner to readily accomodate the angular movement of the throttle lever while providing an accurate linear movement of the speed control member. This is accomplished by the use of a swivelable connector mounted at one end on a shaft projecting from the throttle lever, the other end being adjustably attached to the speed control member. The shaft has a tapered or chamfered nose end inserted into the connector with an annular groove just behind the end that is adapted to receive therein at right angles to the shaft axis one leg of an essentially U-shaped hairpin type spring retaining clip to lock the connector to the shaft. The other leg is springedly crimped around the outside of the connector to retain the clip to the connector. The connector has an oblong slot or opening through it aligned with the groove to normally locate the one leg within the groove to lock the connector to the shaft. However, the slot is of a width sufficient to permit the leg to be moved or deflected laterally outside of the groove to permit the connector to be removed from the shaft. The width also provides room for the nose of the shaft to deflect the one leg outwardly as the connector moves into the shaft until the groove becomes aligned with the leg, whereupon the leg snaps springedly into the groove. This arrangement permits a rotation of the connector as the throttle lever is rotated and moved linearly so that the speed control cable can move linearly a designed amount, and vice-versa.

Connector blocks of the general type described above are known in the prior art. However, none show or describe the novel construction of the invention for connecting two dissimilar moving members in a manner providing accurate controlled movement of one member upon movement of the other.

For example, U.S. Pat. No. 2,358,597, Russell, shows an engine speed control connected to a carburetor throttle control lever; however, the two move rigidly together as a unit in a linear manner only.

U.S. Pat. No. 4,447,032, Olsen, shows a single connector block for controlling two push-pull cables; however, there is nothing such as an arcuately and linearly movable throttle lever connected to a linearly translatable speed control member.

U.S. Pat. No. 1,350,314, Katzmarek, U.S. Pat. No. 2,364,266, Bryce, U.S. Pat. No. 2,865,662, Nurmse, U.S. Pat. No. 3,471,186, Luebbert et al, U.S. Pat. No. 3,604,404, Pitchford, and U.S. Pat. No. 3,863,519, Natori all disclose in general connectors having a releasable locking pin that engages a tapered nose portion of a pin, but not the type of connection disclosed by the invention.

Other objects, features and advantages of the invention will become more apparent upon reference to the succeeding detailed description thereof, and to the drawings illustrating the preferred embodiment thereof; wherein, FIG. 1 is a side elevational view, with parts broken away and in section, of a vehicle accelerator pedal cable to carburetor throttle valve lever assembly, including a connector embodying the invention interconnecting the throttle lever to a speed control cable member;

FIG. 2 is an enlarged cross-sectional view taken on a plane indicated by and viewed in the direction of the arrows II—II of FIG. 1;

FIGS. 3, 4 and 5 are enlarged cross-sectional views taken on planes indicated by and viewed in the direction of the arrows III—III, IV—IV, and V—V, respectively, of FIG. 2;, and, FIGS. 6-8 are plan, side, and end elevational views of a portion of the showing of FIG. 5.

FIG. 1 shows schematically a pull type cable assembly 10 operatively connecting a carburetor throttle valve lever 12 to a conventional vehicle accelerator pedal lever 14. The latter is of a known construction consisting of a bell crank lever 16 pivotally supported upon the vehicle fire wall indicated at 18 and having at its lower end the foot pedal 20 for actuation by the vehicle driver. At its opposite end 22, the lever is connected to the end of a standard Bowden wire type cable 24 suitably guided through the fire wall by means of a fitting 26 slidingly supporting the same.

The Bowden wire cable is a one-piece element of a suitable length as shown for connection at its opposite end to the lever 12. Lever 12 is pivotally connected to an operating lever 28 having a rod 30 within which is connected the end 31 of cable 24. It will be clear that depression of accelerator pedal 20 will pull the cable 24 to the right, as seen in FIG. 1, to pivot the throttle valve lever 12 in a valve opening direction. A return spring, not shown, would be connected to the lower part of lever 12 to cause a return movement of the cable upon release of the accelerator pedal.

A bracket 32 is provided near one end of the cable for attaching and supporting the cable to a part of the vehicle structure, not shown. The bracket has an axial opening through which is inserted the cable assembly, which includes a molded body 34. The latter includes a sheath loosely surrounding the stranded wire cable 24 and butted against one end of a flexible sleeve 36.

The sleeve 36 has essentially a dumbbell-like shape with one end anchored to the body 32 and the other end protruding out of the body to be swivel connected to a dust tube 38. The latter prevents the entry of foreign material to the flexible joint and also protects the Bowden wire cable 24 at this point.

Bracket 32 also supports a second cable assembly 40 that includes a sheathed cable 42 slidably supported in a fitting 44, the latter being anchored to bracket 32 as shown. The right hand end of cable 42 would in this case be connected to an engine speed control servo motor actuated by a control located in the vehicle passenger compartment and initially set by the vehicle driver. The left hand part 46 of the cable is shown connected by a chain type connector 48 to the throttle lever 12 and operating lever 28 through a swivel type connector 50, which is the subject of this invention, and is now to be described.

Connector 50, as best seen in FIGS. 2-8, is an elongated, rectangular in this case, molded plastic body 52 having an axial bore or central passage 54 open to one end. The bore is adapted to be inserted over or receive the rounded or chamfered head or end 56 of a pin type shaft 58 that is fixed to and projects from the throttle valve lever 28. The shaft has an annular locking groove 60 located just behind the head 56 for cooperation with one leg 62 of a hairpin type locking spring clip 64.

As been seen in FIGS. 3, 6 and 7, the body 52 has an oblong or oval passage or hole 65 that intersects bore 54 and permits the leg 62 to move laterally from one side to the other between locking and unlocking positions.

More specifically, the spring clip 64 has essentially a U-shape as seen in FIG. 3, with a straight leg 62 and a crimped leg 68 connected by a base 69. The crimpled leg has a bent over end 70 so as together with the crimped portion resist separation from body 52 once installed with leg 62 inserted through the oval hole 65. The axis of hole 65 extends vertically or at right angles to the horizontal or longitudinal axis of passage 54. It is located so as to laterally or radially align with groove 60 once shaft 58 has been inserted all the way into bore 54. The oval passage 65 has an inner diameter mating that of groove 60 and an outer diameter sufficient to wholly contain the leg 62 within it at times to permit release of the connector 50 from the shaft.

In the free state of clip 64, the minimum distance between the closest parts of legs 62 and 68 is slightly less than the distance from the inner diameter of hole 65 to the inner diameter of a leg locating groove 72 in the body 52. When installed, therefore, the legs of clip 64 will be in compression and forceably sprung laterally apart so that leg 62 will snap into groove 60 when the groove becomes aligned with the clip leg.

The operation is believed to be clear from the above description and a consideration of the drawings. Suffice it to say, however, that insertion of shaft 58 into bore 54, or vice-versa, with clip leg 62 installed through hole 65, first causes the rounded or tapered nose 56 to engage leg 62 and cam or deflect it radially outwardly in hole 65 until the shaft can clear the leg. Further axial movement of the shaft into passage 54 now aligns the groove with hole 65, at which point the leg 62 of the clip springedly returns inwardly into the groove to securely lock the shaft 58 to connector 50. Disconnection is obtained by manually deflecting or deforming the leg 62 laterally outwardly in hole 65 until the shaft 58 again is free to be removed from the connector.

Connector 50 also has a connection at its left end, as seen in FIGS. 4 and 5, to the chain 48 connected to it. A throughbore or hole 74 is provided in body 52, at right angles to the axis of bore 54, for receiving the chain 48. A hole or passage 76 intersects bore 74 at right angles for the insertion of the straight leg portion 78 of a second hairpin type keeper pin 80. The chain 48 would be positioned so that the leg 78 would fall between a pair of the balls 86, as seen in FIG. 4, to lock the chain in place relative to the connector. The other leg 82 is crimped in a conventional manner for cooperation with the matingly shaped end 84 of body 52, for resisting separation of keeper 80 from the connector.

Thus, the connector interconnects both the engine speed control cable 46 and the accelerator pedal lever-throttle valve lever cable 24 to each other in a manner providing finite lengths. The chain 48 can be adjusted to chnge the connecting length to the cable 46 as desired. Depression of accelerator pedal 20, therefore, pulls cable 24 and lever 28 rightwardly in FIG. 1. This causes rod 30 to move both linearly and arcuately as lever 12 pivots. Connector 50 likewise moves similarly, such motion being permitted by the lost motion characteristic of chain 48. On the other hand, when the speed control system, not shown, is activated to demand a particular speed setting, the cable 46 is pulled rightwardly in FIG. 1, which pulls connector 50 in the same direction. The connector now pivots freely on shaft 58 to maintain the alignment of chain 48 with the linear movement of cable 46, while at the same time shaft 58 is moving arcuately with the rotating or pivoting throttle valve lever 12. This motion is transmitted back to the pedal 20 through cable 24, but at this time, such motion is inconsequential.

While the invention has been shown and described in its preferred embodiment, it will be clear to those skilled in the arts to which it pertains that many changes and modifications may be made thereto without departing from the scope of the invention.

I claim:

1. A universal connector for interconnecting a pair of relatively movable members for actuation of one in response to actuation of the other, the connector including an elongated body having an axial passage open at one end, a pin type pivot shaft fixed for rotation with one of the members and having an end projectable into the passage with an annular groove formed thereon, a flexible essentially U-shaped spring retaining clip having a pair of laterally spreadable legs, the body having an opening extending therethrough essentially at right angles to its longitudinal axis for receiving one leg of the retaining clip therethrough, the other leg surrounding an outer peripheral portion of the body in a hook-like manner to springedly retain the clip to the body, the axis of the opening being aligned with and intersecting the shaft groove upon assembly of the shaft of the body, the opening being oblong in cross-section with an inner diameter less than and an outer diameter greater than that of the groove whereby the one leg is received in and passes through the groove upon insertion through the opening to lock the shaft of the body against axial relative movement while permitting rotational movement therebetween, a camming movement of the one leg laterally outwardly in the opening to the outer diameter of the opening moving the one leg laterally out of the groove permitting axial separation between the shaft and connector body, and means connecting the opposite end of the body to the other moving member to permit the body to rotate freely upon the shaft to translate a linear movement of one member into an arcuate and linear movement of the other.

2. A connector as in claim 1, wherein the shaft end projecting into the passage has a rounded cam-like end for easy insertion thereinto followed by a camming outwardly of the one leg into the outer diameter of the groove upon continued axial movement of the shaft until the groove is aligned with the leg for the automatic springable return movement of the leg into the groove.

3. A connector as in claim 1, wherein one of the members rotates at it moves linearly, the outer member moving linearly.

4. A universal self-locking connector for interconnecting an arcuate and linearly translatable carburetor throttle valve lever to a linearly movable speed control member for actuation of one in response to actuation of the other, the connector including an elongated body having an open axial passage at one end, a pin type pivot shaft fixed for rotation and axial translation with the throttle lever and having a chamfered end projecting into the passage with an annular groove formed adjacent thereto, a flexible essentially U-shaped self-locking spring retaining clip having a pair of laterally deformable legs, the body having a second oval shaped opening extending therethrough essentially at right angles to the axis of the passage for receiving one leg of the retaining clip loosely through the opening, the other leg being crimped to surround and hug an outer peripheral portion of the body in a hook-like manner to springedly retain the clip to the body, the axis of the second opening being aligned with and intersecting the shaft groove upon assembly of the shaft to the body, the oval opening having an inner diameter less than and an outer diameter greater than that of the groove whereby the one leg first is cammed outwardly by the chamfered end as the end passes axially into the passage and thereafter is received in the groove upon insertion of the leg through the opening and further axial movement of the shaft through the passage to lock the shaft to the body against axial relative movement while permitting rotational movement therebetween, a camming movement of the one leg laterally outwardly in the second opening to the outer diameter of the opening moving the one leg laterally out of the groove permitting axial removal of the shaft from the passage, and means connecting the opposite end of the body to the speed control member to permit the body to rotate freely upon the shaft to translate movement of the one member to the other.

* * * * *